July 7, 1936. J. DORN 2,047,013
LIGHT CONTROLLED DEVICE OR APPARATUS
Filed Sept. 27, 1934

James Dorn
INVENTOR
By Otto Munk
his ATTY.

Patented July 7, 1936

2,047,013

UNITED STATES PATENT OFFICE 2,047,013

LIGHT CONTROLLED DEVICE OR APPARATUS

James Dorn, London, England, assignor to London Electronics (Machinery) Limited, London, England Application September 27, 1934, Serial No. 745,766
In Great Britain December 23, 1933

1 Claim. (Cl. 41—25)

This invention relates to devices or apparatus controlled by variations in an electric current produced by controlled variation of quantity or intensity of light falling upon a light sensitive substance.

According to the present invention the light control is effected by moving at a fixed rate in a set path across a beam of light directed upon the light sensitive substance, a suitably translucent body which varies in thickness at different points according to the light which it is desired to let pass at those points.

The practice and effect are analogous to the modulation of currents by photographic or painted films or glass slides as in sound reproduction systems and various picture transmission systems. The usefulness of this new method of control appears in those cases when the modulation of an electric current is required to conform to a three-dimensional shape, for example to control a cutting tool to produce a replica or counterpart of a given shape.

By shaping, casting, moulding or impressing suitably translucent material such as paraffin-wax, celluloid, gelatine, or similar substances, light controlling elements representing in the variations of thickness the desired shape can be easily obtained.

The modulated currents may pass through an electro-magnet or its equivalent so that its core moves by an amount corresponding with the strength of the current at any instant. The movement of the core may be used for various purposes, as for instance to control cutting tools or to control automatically various machinery and apparatus.

If the work is fed under a cutting tool, controlled in its movements by said electro-magnet, in synchronism with the transparency across the beam of light, it will be cut to the same shape as the object from which the transparency is moulded. Thus a replica, or counterpart of an object may be produced in material requiring the use of a cutting tool, by using as the light controlling element a primary replica or counterpart easily produced by moulding etc. translucent material of the nature above mentioned. Repetition work is also possible by employing the same primary replica or counterpart.

In the accompanying drawing.

Figure 1:
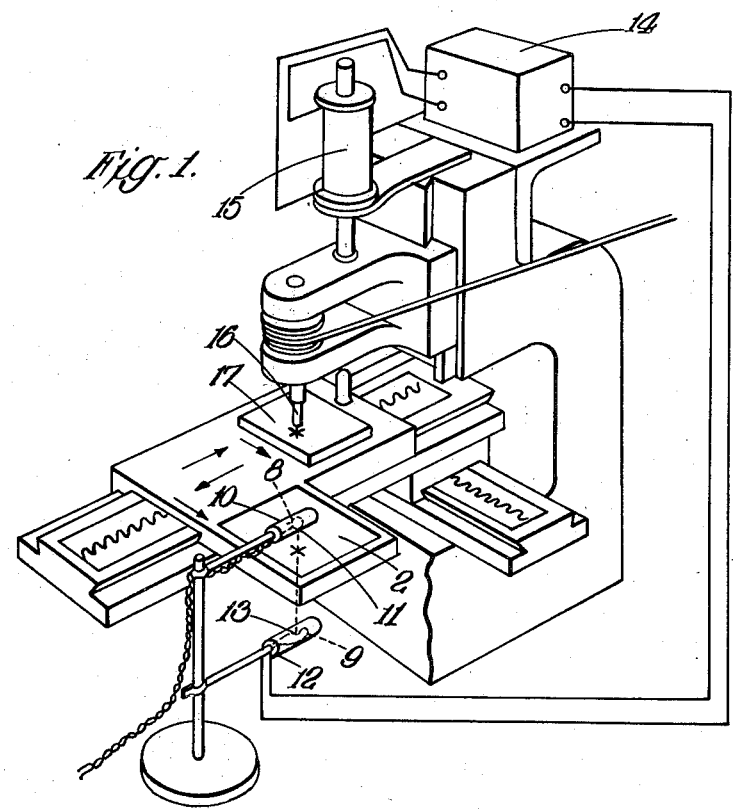
Figure 1 shows in a crude schematic manner a light controlled apparatus employing a flat or slab-shaped transparency.

Referring to Figure 1, the device is provided with a light controlling element 2 of sufficient transparency with suitable means (not shown here in detail) for moving every portion of it in a fixed path past an aperture 11. This element 2 is moulded or cast so that its thickness from point to point varies according to the shape chosen and the variations of current required.

A source of light 8 is situated behind the aperture 11 in the tube 10 to cast a beam of light through the element 2 on to a light-sensitive device 9 which controls the output current either directly or by a thermionic amplifier 14. An aperture 13 is formed in the side of tube 12 to allow a beam of light to pass through the element 2 on to the light-sensitive device 9 which is mounted within the tube 12. The modulated current from the amplifier 14 controls through the electro-magnet 15 the depth of the cut of a rotating cutting tool 16 operating on the work 17 which is moved in synchronism with the light controlling element 2, it being mounted on the same table as the latter. As indicated above however, Figure 1 is merely a crude schematic drawing for illustration purposes, and the present invention is not concerned with the actual construction of any particular machine or apparatus.

Figure 2:
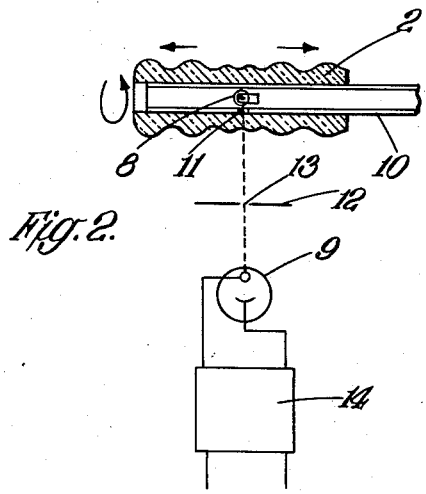
Figure 2 shows diagrammatically an arrangement in which the light falling upon a light-sensitive device is controlled by a cylindrical transparency.

In the modification shown in Figure 2 the transparent element 2 is of cylindrical form with a cylindrical core and this is mounted on a non-rotating tube 10 containing the source of light 8. The tube is provided with an aperture 11 opposite the source of light. The element is given rotational motion and an axial movement at the same time so that the beam of light traces out a spiral path over its whole surface. 12 is a screen corresponding with the tube 12 of Figure 1 and having an aperture 13. 9 is the light-sensitive device and 14 an amplifier. If the work is given synchronous axial and rotational movement in apparatus having a tool suitably controlled by current from the said amplifier, it will be cut to the same external shape as the control element 2.

What I claim and desire to secure by Letters Patent of the United States is:—

Method of reproducing an object, for example a carving, having an extensive surface which is irregular in various directions, said method comprising scanning a translucent pattern of the object, contoured in accordance therewith, by a narrow pencil of light passing therethrough on to a light sensitive device, so that the light pencil traces out a path passing successively through all the elemental areas of the pattern and is varied in intensity in accordance with the varying thickness thereof, simultaneously relatively moving a blank and a tool in a similar path, and causing the tool to be advanced or withdrawn in relation to the blank by an electric current controlled by the light-sensitive device.

JAMES DORN.